United States Patent
Liu et al.

(10) Patent No.: US 8,880,438 B1
(45) Date of Patent: Nov. 4, 2014

(54) DETERMINING CONTENT RELEVANCE

(75) Inventors: Yifang Liu, Mountain View, CA (US); Jing Li, Mountain View, CA (US)

(73) Assignee: Google Inc., Mountain View, CA (US)

( * ) Notice: Subject to any disclaimer, the term of this patent is extended or adjusted under 35 U.S.C. 154(b) by 483 days.

(21) Appl. No.: 13/397,630

(22) Filed: Feb. 15, 2012

(51) Int. Cl.
*G06N 5/02* (2006.01)

(52) U.S. Cl.
CPC .................................. *G06N 5/02* (2013.01)
USPC ................................ 706/12; 706/46

(58) Field of Classification Search
None
See application file for complete search history.

(56) References Cited

U.S. PATENT DOCUMENTS

| | | | |
|---|---|---|---|
| 7,831,472 B2 | 11/2010 | Yufik | |
| 8,078,617 B1 | 12/2011 | Neveitt et al. | |
| 8,086,624 B1 | 12/2011 | Hubinette | |
| 2009/0024962 A1* | 1/2009 | Gotz | 715/838 |
| 2009/0055144 A1* | 2/2009 | Taylor et al. | 703/6 |
| 2010/0262568 A1 | 10/2010 | Schwaighofer et al. | |
| 2011/0270672 A1 | 11/2011 | Hillard et al. | |

OTHER PUBLICATIONS

Engelbrecht, Ap et al.; "Determining the Siginificance of Input Parameters Using Sensitivity Analysis"; 1995; Springer; From natural to artificial neural computation; pp. 382-388.*

* cited by examiner

*Primary Examiner* — Stanley K Hill
(74) *Attorney, Agent, or Firm* — Foley and Lardner LLP; John D. Lanza

(57) ABSTRACT

System and methods allow for ranking relevance of parameters of a content item. A method includes: receiving, using at least one processing circuit, a plurality of parameters of a content item and a plurality of corresponding initial relevance scores of the parameters indicating relevance of the parameters to the content item; estimating, using a statistical model, a plurality of revised relevance scores from the initial relevance scores, wherein each of the revised relevance scores is a function of at least two of the plurality of initial relevance scores; and ranking the plurality of parameters based on the revised relevance scores.

20 Claims, 4 Drawing Sheets

DETERMINING CONTENT RELEVANCE

BACKGROUND

This specification relates generally to systems and methods for distributing content and more particularly, to determining content relevance.

The Internet provides access to a wide variety of resources, such as video files, audio files, pictures, business and personnel contact information, product information, maps, and news articles. Accessing these resources can produce business opportunities. For example, when content is distributed, selected alternative content items (e.g., advertisements) may be distributed together with the content.

SUMMARY

In an aspect, a computer-implemented method is provided for ranking relevance of parameters of a content item, the method including: receiving, using at least one processing circuit, a plurality of parameters of a content item and a plurality of corresponding initial relevance scores of the parameters indicating relevance of the parameters to the content item; estimating, using a statistical model, a plurality of revised relevance scores from the initial relevance scores, wherein each of the revised relevance scores is a function of at least two of the plurality of initial relevance scores; and ranking the plurality of parameters based on the revised relevance scores.

In some implementations, the method further includes: receiving data indicative of actual ranking of parameters of a plurality of content items; and training the statistical model using the data.

In some implementations, the training is based on at least one of a logistic regression method, a linear regression method, or a Naive Bayes method.

In some implementations, the parameters include at least one of a keyword, a semantic cluster extracted from text of the content item, a category of the content item, or data indicative of user identifiers' visits to the content item.

In some implementations, the method further includes: determining co-occurrences among the plurality of parameters; and pruning the plurality of initial relevance scores as variables of the function.

In some implementations, the pruning includes pruning parameters and their associated initial relevance scores having a co-occurrence frequency with respect to a relevant parameter lower than a threshold.

In some implementations, the method further includes receiving a bid for an online slot for the content item based on the ranking.

In some implementations, the receiving is from a plurality of sources, and wherein the plurality of initial relevance scores are obtained from combined voting from the plurality of sources.

In another aspect, a system is provided for ranking relevance of parameters of a content item, the system including at least one processing circuit configured to: receive a plurality of parameters of a content item and a plurality of corresponding initial relevance scores of the parameters indicating relevance of the parameters to the content item; estimate, using a statistical model, a plurality of revised relevance scores from the initial relevance scores, wherein each of the revised relevance scores is a function of at least two of the plurality of initial relevance scores; and rank the plurality of parameters based on the revised relevance scores.

In some implementations, the at least one processing circuit is further configured to: receive data indicative of actual ranking of parameters of a plurality of content items; and train the statistical model using the data.

In some implementations, the statistical model is trained based on at least one of a logistic regression method, a linear regression method, or a Naive Bayes method.

In some implementations, the parameters include at least one of a keyword, a semantic cluster extracted from text of the content item, a category of the content item, or data indicative of user identifiers' visits to the content item.

In some implementations, the at least one processing circuit is further configured to: determine co-occurrences among the plurality of parameters; and prune the plurality of initial relevance scores as variables of the function.

In some implementations, the at least one processing circuit is further configured to receive a bid for an online slot for the content item based on the ranking.

In some implementations, the system further includes a plurality of parameter sources, wherein the plurality of initial relevance scores are obtained from combined voting from the plurality of sources.

In another aspect, a non-transitory computer-readable medium is provided having instructions stored thereon for execution by at least one processing circuit to rank relevance of parameters of a content item, the instructions including: receiving a plurality of parameters of a content item and a plurality of corresponding initial relevance scores of the parameters indicating relevance of the parameters to the content item; estimating, using a statistical model, a plurality of revised relevance scores from the initial relevance scores, wherein each of the revised relevance scores is a function of at least two of the plurality of initial relevance scores; and ranking the plurality of parameters based on the revised relevance scores.

In some implementations, the instructions further include: receiving data indicative of actual ranking of parameters of a plurality of content items; and training the statistical model using the data.

In some implementations, the training is based on at least one of a logistic regression method, a linear regression method, or a Naive Bayes method.

In some implementations, the instructions further include: determining co-occurrences among the plurality of parameters; and pruning the plurality of initial relevance scores as variables of the function.

In some implementations, the pruning includes pruning parameters and their associated initial relevance scores having a co-occurrence frequency with respect to a specified parameter lower than a threshold.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the implementations may be shown exaggerated or enlarged to facilitate an understanding of the implementations. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

DETAILED DESCRIPTION

Figure 1:
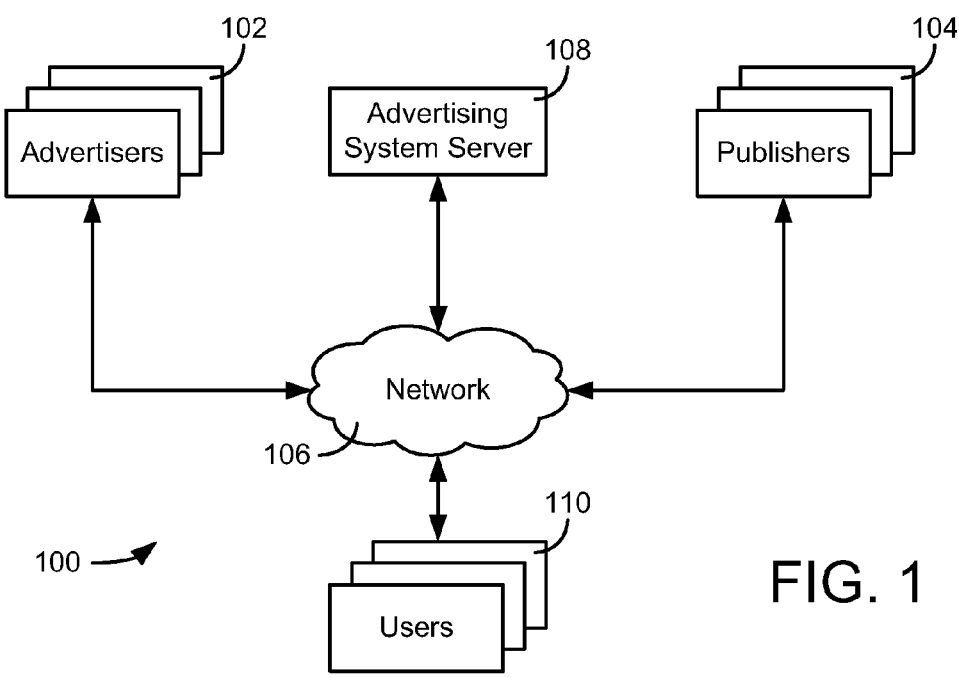
FIG. 1 is a block diagram of an example of an advertising system in accordance with some described implementations.

Following below are more detailed descriptions of various concepts related to, and implementations of, methods and systems for selecting and distributing content. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

A webpage such as a search result page or a content page as requested by a user can include slots in which alternative content items (e.g., advertisements) can be presented. These advertisement slots can be defined in the webpage or defined for presentation with a webpage, for example, as part of the webpage, or in a pop-up window. As used herein, a "user" may refer to an identifier of an individual user, a user device, a user browser, etc., and does not necessarily refer to the actual individual user. The identifiers may include cookies, for example. The cookies can include activity data for more than one user, and one user can have several cookies (e.g., on different machines, different browsers, different times, etc.). Users may opt out of data collection, and users may opt in to provide additional demographic data for improved online experience. The identifiers associated with user data may be anonymized and not connected to user names or actual identities, or other sensitive information.

Content publishers, such as website owners, often receive income by allowing content providers, such as advertisers to place content items, such as advertisements, in or with published content. For example, an owner of a website devoted to golf may allow an online retailer that sells golf clubs to advertise on one or more webpages of their website. In return, the advertiser may compensate the website owner based on one or more measurements of traffic to the website, or based on one or more other factors. A website may have multiple webpages. Advertisers can choose one, more than one, of all webpages of a website for display of advertisements, and can choose from among different slots (sizes, positions, formats, etc) on each webpage, including different ones on different webpages.

Advertisement slots can be allocated to advertisers through an auction. For example, a plurality of advertisers can provide bids specifying amounts that the advertisers are respectively willing to pay for presentation of their advertisements. In turn, an auction can be performed and the advertisement slots can be allocated to advertisers according to their bids. When one advertisement slot is being allocated in the auction, the advertisement slot can be allocated to the advertiser that provided the highest bid or a highest auction score (e.g., a score that may be computed as a function of a bid and/or an advertisement quality measure, where the advertisement quality measure can be how well the content of the advertisement matches users' searches for certain keywords). When multiple advertisement slots are allocated in a single auction, the advertisement slots can be allocated to a set of bidders that provided the highest bids or have the highest auction scores.

An advertiser, when conducting marketing through the Internet, often has an account associated with the marketing effort. The associated account information may include, for example, a unique email address, a password, billing information, etc. Advertisement management accounts can enable advertisers to specify keywords and corresponding bids that are used to control allocation of their advertisements. The advertiser can track the performance of advertisements that are provided using the keywords and corresponding bids. For example, an advertiser can access the advertisement management account and view performance measures corresponding to the advertiser's advertisements that were distributed using each keyword. In turn, the advertiser can adjust settings that control the allocation of advertisements and compare the performance measures for the advertisements that are allocated using the new settings. The settings may be adjusted based on advertisers' criteria, including for example information regarding accounts, campaigns, advertisement group, serving criteria, etc.

The advertising can be part of Internet marketing (also known as online marketing, web marketing, or e-marketing). The effectiveness of online marketing can be measured by cost per impression (CPI), or cost per thousand impressions (CPM), where an impression may be counted, for example, whenever an advertisement server counts a loading of an advertisement onto a user's screen. Some of the impressions lead to users' clicking on the ad, and a click-through rate (CTR) may be defined as the number of clicks on the advertisement divided by the number of impressions.

Some of the users visiting the webpage may take a desired action beyond simple browsing (impression) of the webpage. The desired actions may include, for example, buying a product from the webpage, joining a membership, opening an account, subscribing a newsletter, downloading an application, etc. The percentage of such visitors taking the desired actions may be referred to as the conversion rate (CVR).

Advertisement pricing sometimes can be more accurately determined by cost per action (CPA). The actions may include, for example, users' interacting with the advertisement such as clicking on the advertisement or a link therein, users' purchase of a product, users' referring the advertisement to other users, etc. Correspondingly, the advertisement pricing may be measured as cost per click-through (CPC; counted when an advertisement is clicked), cost per sale (CPS), cost per lead (CPL), or other metric. Sometimes an effective CPM (eCPM) may be used to measure the effectiveness of an ad, where actual actions such as clicks may be factored into the calculation.

An advertisement campaign may refer to an advertising activity, such as serving specific advertisements to users in certain geographical locations, serving specific advertisements to different product lines, or serving specific advertisements to certain user groups. Campaign information may include, for example, one or more budgets for one or more time periods (e.g., a daily budget), geo-targeting information, syndication preference information, start and end dates of the campaign, etc. For example, a fashion designer may have an advertising campaign for its shoe division and another advertising campaign for its clothing division. Each advertisement group (e.g., one or more ad creatives) under each campaign may include budgetary information. Budgetary information may include cost per selection, cost per conversion, etc. The advertisers may control their campaigns including the budgets using their management accounts.

FIG. 1 is a block diagram of an example advertising system 100 in accordance with some described implementations. One or more advertisers 102 may directly, indirectly, etc., provide advertisement data to the advertisement system 100, and may maintain the advertisement data, track advertisement data, store advertisement data, remove advertisement data, etc. The advertisements may be in any format that may be represented to the user, for example, graphical, text, image, audio, video, etc. The advertisements may also be a combination (hybrid) of the formats. The advertisements may be banner ads, interstitial ads, pop-up ads, rich media ads, hybrid ads, etc. The advertisements may also include embedded information such as hyperlinks, metadata, links, machine-executable instructions, annotations, etc. In some implementations, the system 100 may serve other forms of content.

In some implementations, one or more publishers 104 may provide, directly or via a user's device, requests for advertisements to the system 100. The system 100 may provide candidate advertisements to the publisher 104 or to the user accessing the publisher's content for presentation on the publisher's web space, properties, etc. (e.g., webpage, website, network, other content, etc.)

Users 110, advertisers 102, etc. may provide information to the system. For example, the information may include CTR, impressions, conversions, etc. The system may measure the information and provide reports to the users 110, advertiser 102, etc. The system may also receive financial information from advertisers 102, credit publishers 104, etc.

The network 106 may be any form of computer network that relays information between the advertising system server 108, an advertiser 102, a publisher 104, and a user 110. For example, network 106 may include the Internet and/or other types of data networks, such as a local area network (LAN), a wide area network (WAN), a cellular network, satellite network, or other types of data networks. The network 106 may also include any number of computing devices (e.g., computer, servers, routers, network switches, etc.) that are configured to receive and/or transmit data within network 106. The network 106 may further include any number of hardwired and/or wireless connections. For example, users 110 may communicate wirelessly (e.g., via WiFi, cellular, radio, etc.) with a transceiver that is hardwired to other computing devices in the network 106 (e.g., via a fiber optic cable, a CAT5 cable, etc.).

The publisher 104 may include a general content server that receives requests for content (e.g., articles, comment threads, music, video, graphics, search results, web pages, information feeds, etc.) and provides the requested content. The content server may serve a request for an advertisement to the advertising system server 108 via the network 106. The advertisement request may include a quantity, location information, frequency, category, advertisement type, etc.

The content server may combine an advertisement with the requested content from the user 110. The advertisement and content may be provided to the user 110 via the network 106 to a browser, an application, etc. The content server may provide information about the advertisement provided to the user 110 back to the advertising system server 108. The information may include the schedule of the advertisement (e.g., date, time, etc.), the position of the ad, size of the ad, how the advertisement should be rendered (e.g., HTML, JavaScript, etc.), etc.

The publisher 104 may also be a search engine. A search engine may receive search queries for results. The search engine retrieves relevant search results from an index of documents (e.g., web pages, etc.) Search results may include web page titles, hyperlinks, etc. The search engine may provide an advertisement request to the advertising system server 108. The request may include a quantity, a format, the search query, information related to the query (e.g., location information), etc. The search engine may combine the search results with a candidate advertisement provided by the system 100. The combination may be provided to the user 110. A delineation may be made between the search results and the advertisements so as to not confuse the users 110. The search engine may also provide information regarding the provided advertisement to the advertising system server 108.

The advertising system server 108 may provide advertisement or other content to publishers 104 via content servers, search engines, display networks, etc. The advertising system server 108 may provide advertisements targeted to documents (e.g., web pages) provided by content servers. The search engine may crawl the documents to obtain content. Documents may include web pages, URLs, metadata, embedded information (e.g., links, media, etc.), email, etc.

The serving criteria (serving constraints) may include advertisement conditions or constraints on the serving (providing) of advertisements to the users 110. For example, an advertiser may specify that an advertisement should only be shown to persons living in a certain geographic region. In another example, the advertiser may specify that an advertisement should only be shown when the page, document, search query, etc. matches certain keywords, phrases, etc. In some implementations, the advertiser may specify that an advertisement be served only if the web page includes certain clusters, concepts, topics, etc.

The users 110 may communicate within the system via a computing device. The computing device may be any form of electronic device that includes a processor and a memory, i.e., a processing circuit. The memory may store machine instructions that, when executed by a processor, cause the processor to perform one or more of the operations described herein. The memory may also store one or more web pages on computing device. The processor may include a microprocessor, ASIC, FPGA, etc., or combinations thereof. The memory may include, but is not limited to, electronic, optical, magnetic, or any other storage or transmission device capable of providing processor with program instructions. The memory may include a floppy disk, CD-ROM, DVD, magnetic disk, memory chip, ROM, RAM, EEPROM, EPROM, flash memory, optical media, or any other suitable memory from which processor can read instructions. The instructions may include code from any suitable computer programming language such as, but not limited to, C, C++, C#, Java, JavaScript, Perl, HTML, XML, Python and Visual Basic.

According to various implementations, the computing device may include a transceiver configured to communicate wirelessly with the network 106 via a transceiver station. For example, the transceiver station may be a cellular tower, a mobile hotspot (e.g., a Wi-Fi access point), a satellite transceiver, or similar mechanism that provides wireless access to the network 106. According to various implementations, the computing device may be configured to communicate directly with a client, in addition to, or in lieu of communicating with the transceiver station. For example, the computing device may be hardwired to the client via a cable (e.g., a USB cable, a parallel port cable, etc.). In another example, the computing device may communicate wirelessly with the client via the transceiver using a short-range wireless protocol (e.g., ad-hoc Wi-Fi, Bluetooth, etc.).

The computing device may include one or more user interface devices, according to various implementations. A user interface device may be any electronic device that conveys data to a user by generating sensory information (e.g., a visualization on a display, one or more sounds, haptic output, etc.) and/or converts received sensory information from a user into electronic signals (e.g., a keyboard, a mouse, a pointing device, a touch screen display, a microphone, etc.). The one or more user interface devices may be internal to the housing of the computing device (e.g., a built-in display, microphone, etc.) or external to the housing of computing device (e.g., a monitor connected to the computing device, a speaker connected to computing device, etc.), according to various implementations. For example, the computing device may include an electronic display, which may display a digital image captured by the computing device and/or a GUI.

Parameters of a content item may include features that characterize the content item, and may be useful in the selection/ranking of the content items. For an advertisement, the parameters may sometimes be referred to as "advertisement criteria." Examples of the parameters may include keywords and semantic clusters extracted from the ad text, categories (some times referred to as "verticals") of the advertisement, list of previous users interacting with the advertisement, etc.

In a content delivery system, such as a system of advertising through third-party publishers or through a search engine provider, the content item (e.g., advertisement) to be delivered may be relevant to the main content (e.g., third-party webpages or the search results). Such relevance may affect an auction price in an advertisement system for advertisers to bid for a position for the advertisement. For example, an advertisement highly relevant to a third-party webpage or a search query can win an auction with a lower price against a less-relevant advertisement with a higher price. As the advertisement can be characterized by a plurality parameters, the relevance of the advertisement to the main content or search queries can be obtained by comparing the parameters with corresponding parameters extracted from the main content.

Because all the parameters are not of the same relevance to a specific advertisement, the parameter ranking may be employed to assign rankings/ratings to related parameters based on how relevant they are to the specific advertisement. Such ranking may help quantify the relevance between the advertisement and the main content. Parameter relevance can be measured by a performance metric, e.g., CTR, or CVR on the specific advertisement. Thus, these parameters can be used to predict the ranking of the specific advertisement in an auction. For example, advertisement ranking can be predicted with some relevance variables, e.g., eCPM, pCVR, because the estimation of the advertisement's relevance to the main content (and consequently the ranking of the advertisement) may depend on the parameters' relevance rankings or ratings.

Conventional parameter ranking methods often suggest not-highly-relevant parameters for new advertisements, likely resulting from flawed assumptions and methodology in the parameter ranking. For example, existing methods often directly accept raw parameter rankings as the final rankings. In a simplified example, the raw rankings of three parameters, $c_1$="spacecraft," $c_2$="space shuttle," $c_3$="sandwiches" for an advertisement may be simply taken as following an order from the highest rated (e.g., based on predetermined ratings of the phrases" to the lowest rated parameter, such as in the order of $c_1$, $c_2$, $c_3$. As such, this ranking system would treat parameter $c_1$ as most relevant to the advertisement, and use $c_1$ to represent the advertisement in the auction.

In a method with an implicit assumption that the raw parameter rankings are independent of each other (i.e., orthogonal in a raw ranking space), or that the relationships among the raw parameters are not relevant for the ranking, the raw ranking may not properly model the parameter relevance for the specific advertisement.

The described implementations allow proper ranking of the parameters based on the advertisement's properties, for example by matching the advertisement with performance of historical advertisements. The estimated relevance of a parameter may be computed as a function of the raw rankings of all related parameters. As such, the information throughout the full context of the advertisement may be preserved by constructing a vector of all raw parameter rankings in a ranking space. Such a ranking space may be a hyper-dimensional space, i.e., with the number of dimensions larger than 3.

In one example, a numerical space transformation may be performed to transform the raw ranking space into a new ranking space, where a relevance score $c_1'$ for $c_1$ may be a function of all the parameters, $c_1$, $c_2$, and $c_3$. That is, $c_1'=f(c_1, c_2, c_3)$. The function f can be further simplified and the dimensions of the space reduced, for example by considering co-occurrence of the different raw parameters. In an illustrative example, $c_1$ and $c_1$ (obviously) co-occur 100% of the time (e.g., the phrase "spacecraft" always appears with itself), $c_1$ and $c_2$ may co-occur 50% of the time (e.g., the phrases "spacecraft" and "space shuttle" often appear together), and $c_1$ and $c_3$ may co-occur less than 10% o the time. Thus, $c_1'$ is a function of $c_1$, and may also be a function of $c_2$. On the other hand, a threshold may be selected (e.g., 10%) such that the co-occurrence below this threshold may indicate that $c_1$ and $c_3$ are not related or that their relationship is not significant for the ranking purpose. Thus, $c_1'$ may effectively be a function of $c_1$ and $c_2$ only, $c_1'=f(c_1, c_2)$. As such, the requirement for computing resources may be reduced substantially. During these operations, the parameters may be effectively "clustered." For example, $c_1$ and $c_2$ would be grouped into one cluster, while $c_3$ may be considered outside this cluster.

As such, the statistical models can numerically cluster all advertisements based on their historical performance in the raw parameter ranking space, with the dimensions of the space being the raw rankings of all related parameters. For each advertisement cluster, every parameter's estimated (e.g., revised from the raw ranking) relevance score may be modeled by a function of all related parameters' raw rankings. The function (e.g., model) may be configured by a statistical learning/training engine based on historical data. In an example, according to historical performance data, an advertisement with a raw parameter ranking [$c_1$, $c_2$, $c_3$] may actually have $c_3$ as the most relevant parameter (e.g., an advertisement for a sandwich shop may have gotten the most clicks historically), contrary to the result of using raw rankings without the learning/training process from the historical data.

In accordance with some described implementations, historical data may be used to train a statistical model to achieve a best fit of historical data from raw relevance rankings. Model parameters can be tuned and optimized during the learning/training process, and mathematical methods such as maximum likelihood optimization may be employed.

When a new advertisement registers into the system, it may be projected to a most-likely advertisement cluster in the raw ranking space according to the raw rankings of all related parameters for the new advertisement. Based on the most-likely advertisement cluster, each related parameter for the new advertisement can be estimated for parameter relevance.

As such, a model between raw parameter rankings and estimated (revised) criterion relevance may be statistically established, and the statistical model of each parameter may be based on the full-context of an advertisement, i.e., all related parameters' raw rankings, thus preserving the valuable information in the characterization of the advertisement. This can lead to more accurate positioning of an advertisement in the raw ranking space, and provide a better estimation of parameter relevance through a more proper statistical model in the full-context domain. As a result, more relevant advertisements may be delivered to users.

Figure 2:
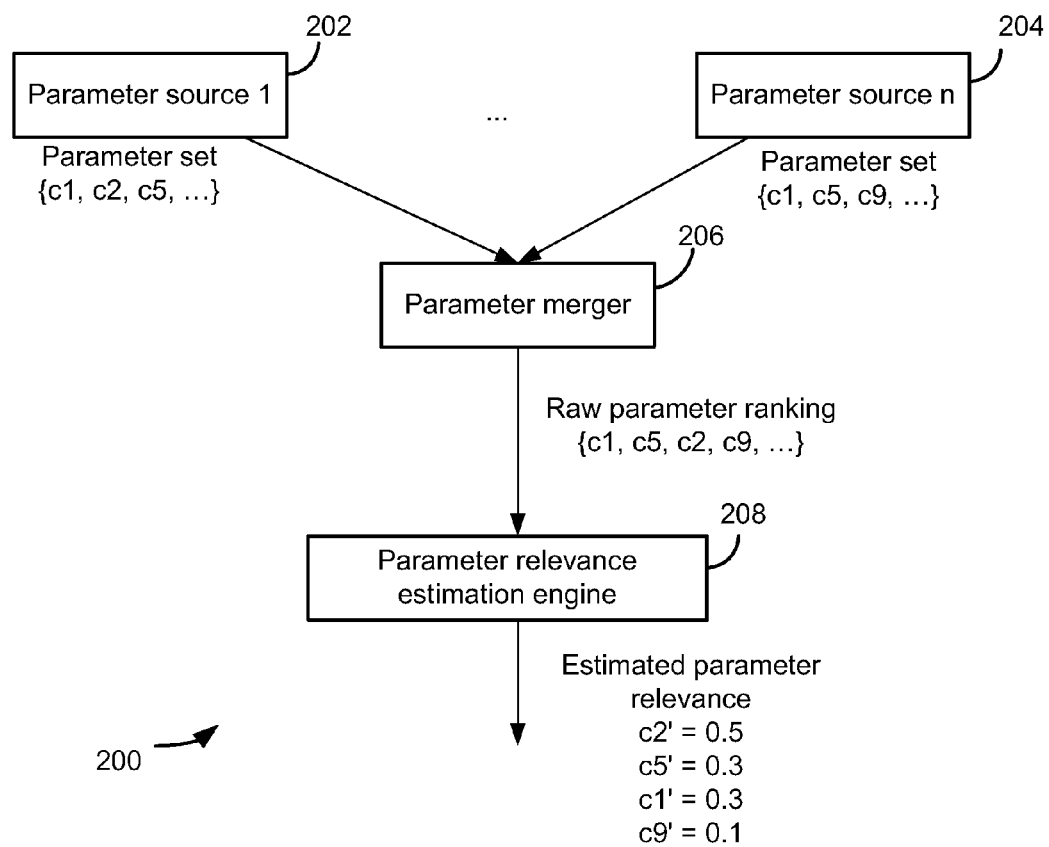
FIG. 2 is a block diagram of an example of a system for determining content relevance in accordance with some described implementations.

In the block diagram of FIG. 2, an example advertisement parameter ranking system 200 is illustrated. The system may include a plurality of parameter sources 202, 204, etc. Parameters can be extracted respectively from the different sources, such as parameter set {c1, c2, c5} and parameter set {c1, c5, c9}. These parameter sets may be extracted by analyzing landing pages of the advertisement and determining parameters related to the advertisement. Other sources for parameters may include, for example, metadata of content, texts of webpages and/or content items, images (through various recognition technologies), and those provided by advertisers, etc.

Parameter merger 206 may merge the different parameter sets, and provide a raw parameter ranking such as {c1, c5, c2, c9, ...}. The raw ranking may be associated with an initial set of relevance scores, such as from high to low of 1, 0.5, 0.25, 0.13, ..., respectively, for parameters c1, c5, c2, c9. The combined raw rankings can be obtained by rating the parameters based on combined voting from all of the parameter sources. Revised relevance scores of the parameters can be provided by a parameter relevance estimation engine 208 according to some described implementations. The parameter relevance estimation engine 208 can be used to select the top ranked parameter as the most relevant parameter for the advertisement to participate in the competition in an auction. In the example illustrated in FIG. 2, the revised relevance scores are c2'=0.5, c5'=0.3, c1'=0.3, and c9'=0.1, respectively, for parameters c2, c5, c1, c9. Thus, c2 would be considered as the most relevant parameter. Alternatively, multiple parameters can be used, with different weights derived from the relevance scores, in the auction.

Without the parameter relevance estimation engine 208 according to the described implementations, raw parameter rankings may lead to unsatisfactory advertisement ranking, which in turn may result in less-relevant advertisements being delivered to users, and thus low CTR and CVR and slow convergence to good advertisement quality.

On the other hand, with the more accurate estimation of parameter relevance according to the described implementations, estimation of individual advertisement's relevance (advertisement ranking) is improved. Thus, the best (e.g., most relevant and cost efficient) advertisements will more likely win the auction, leading to improved cost efficiency, faster turnaround for advertisement selection, and improved user experience, benefiting the users, advertisers, and publishers.

In an example where more rigorous mathematical formulation is employed to describe the above processes, let $x_i$ be the raw ranking (a scalar variable) of the parameter for an advertisement. For example, $x_i$ can be a categorical variable or a numerical variable. Let $y_i$ be the indicator variable that suggests whether the $i^{th}$ parameter is relevant to an advertisement. $y_i=0$ may indicate that the $i^{th}$ criterion is not relevant, and $y_i=1$ may indicate that the criterion is relevant. Let $f_i$ be the estimated relevance of the $i^{th}$ parameter for an advertisement, i.e., the probability of $y_i=1$.

The predictor variable used to estimate the relevance of the $i^{th}$ parameter can be a vector $[x_1, x_2, \ldots, x_n]$, where n is the total number of raw parameter rankings. The values of $x_1, x_2, \ldots, x_n$ for a specific advertisement may be obtained, for example, by combining the parameter sources' voting. The $i^{th}$ response variable would be $f_i$, i.e., the estimated relevance of the $i^{th}$ parameter. The statistical model of $f_i$ can be trained by any of a number of statistical learning methods, e.g., logistic regression, linear regression, Naive Bayes, etc.

In logistic regression, the estimated probability $f_i$ for the $i^{th}$ parameter may take the form of:

$$f_i = \frac{1}{1 + e^{-z_1}}$$
$$z_i = \beta_{1,0} + \beta_{1,1} x_1 + \beta_{1,2} x_2 + \ldots + \beta_{1,j} x_j + \ldots + \beta_{1,n} x_n$$

...

$$f_i = \frac{1}{1 + e^{-z_i}}$$
$$z_i = \beta_{i,0} + \beta_{i,1} x_1 + \beta_{i,2} x_2 + \ldots + \beta_{i,j} x_j + \ldots + \beta_{i,n} x_n$$

...

$$f_i = \frac{1}{1 + e^{-z_n}}$$
$$z_n = \beta_{n,0} + \beta_{n,1} x_1 + \beta_{n,2} x_2 + \ldots + \beta_{n,j} x_j + \ldots + \beta_{n,n} x_n,$$

where $\beta_{i,j}$ are parameters for the statistical model and can be derived from the fitting or training process.

The observed value of the parameter relevance $f_i$ may be considered as an efficiency measurement of an advertisement, e.g., a function of CTR or CVR. Given the set of observed values of parameter relevance, together with the corresponding raw parameter rankings in all historical advertisement performance data (the training set), logistic regression procedures may allow the training of the model parameters $\beta_{i,j}$ in various approaches, e.g., maximum likelihood optimization by a Newton-Raphson method.

Figure 3:
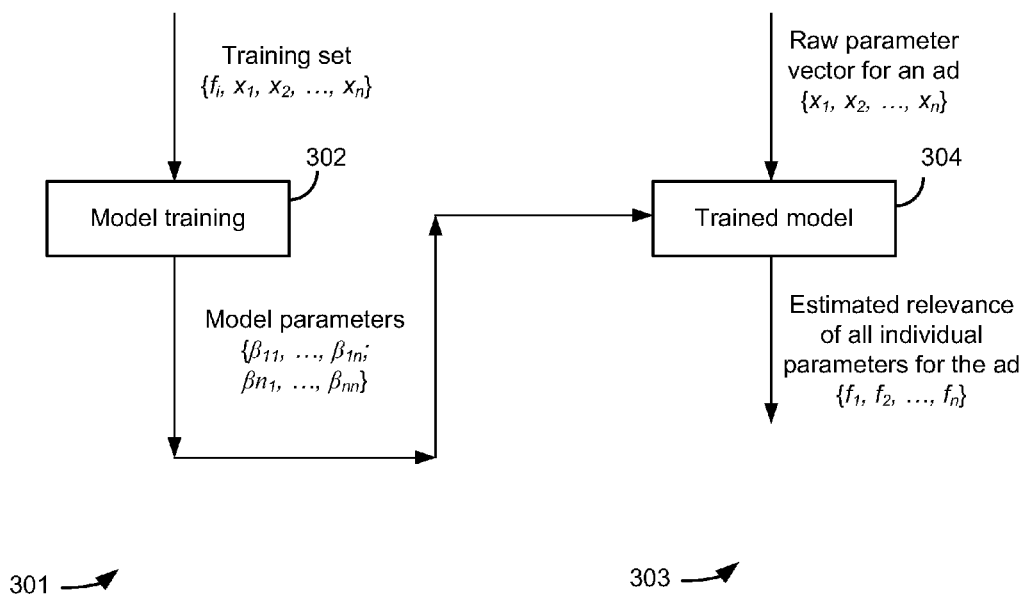
FIG. 3 is a flow diagram of example processes for determining content relevance in accordance with some described implementations.

In an illustrative example, a model training flow 301 and a parameter relevance estimation flow 303 are shown in the block diagram of FIG. 3.

In a conventional method, without the statistical model according to the described implementations, for a new advertisement the estimated relevance of the parameter would be $f_i=x_i$, where the raw parameter scalar $x_i$ is adopted. In contrast, according to the method illustrated in FIG. 3, $\{x_i\}$ may be used as a training set in a model training process 302.

For each new advertisement, the trained model 304 can provide an estimated relevance score of the $i^{th}$ parameter as $$f_i = \frac{1}{1 + e^{-z_i}},$$
$$z_i = \beta_{i,0} + \beta_{i,1} x_1 + \beta_{i,2} x_2 + \ldots + \beta_{i,j} x_j + \ldots + \beta_{i,n} x_n,$$

where the raw parameter vector $[x_1, x_2, \ldots, x_n]$ can be different from advertisement to advertisement, and the model parameters $\beta_{i,0}, \beta_{i,1}, \beta_{i,2}, \ldots, \beta_{i,n}$ can be different from model (for parameter i) to model (for parameter i'). Thus, every individual advertisement can be characterized in its full context, in terms of all relevant parameters.

As such, the statistical model according to the described implementations effectively clusters all advertisements numerically in the space of raw parameter rankings. Such a clustering can be reflected in the above equations, without an express operation of clustering. The estimated relevance of an individual parameter of a numerical advertisement cluster can thus be modeled much more accurately, with numerically differentiated advertisement clusters. A parameter's relevance for a new advertisement can thus be effectively predicted by establishing the statistical relationship between the estimated parameter relevance, and the full context of the advertisement through the raw rankings of all related parameters.

Logistic regression may be prone to overfit in high dimensions. The training procedure may become unnecessarily lengthy if the model has a high dimensionality. Therefore, it may be helpful to eliminate unnecessary dimensions for the statistical model of each parameter. In some implementations, this may be achieved by feature selection. In an example, for each parameter, there may be a small group of parameters that co-occur with the parameter frequently in all advertisements. This small number of parameters may be the ones closely related to the parameter of interest and thus may have relatively high impact on the parameter's relevance estimation. As such, this small set of parameters can be the selected features for the parameter in interest. For example, they can be used as the predictor variables in the dimensionality-reduced statistical model for the parameter of interest.

In an example, for parameter $c_1$, its selected features may be $x_1, x_2, x_5, x_{10}$; while for criterion $c_2$, its selected features may be $x_2, x_3, x_{10}, x_{15}$. These feature selections would shape the statistical models for parameters $c_1$ and $c_2$ in the following form:

$$z_1 = \beta_{1,0} + \beta_{1,1} x_1 + \beta_{1,2} x_2 + \beta_{1,5} x_5 + \beta_{1,10} x_{10}$$

$$z_1 = \beta_{2,0} + \beta_{2,2} x_2 + \beta_{2,3} x_3 + \beta_{2,10} x_3 + \beta_{2,15} x_{15}.$$

It may be noted that although four features may be selected for each of parameters $c_1$ and $c_2$, different numbers (dimensions) of features can be selected for different parameters. That is, $z_1$ and $z_2$ may be functions of different numbers of features.

As illustrated in FIG. 3, the statistical model 304 may be trained with historical advertisement performance data and their observed values of parameter relevance. When a new advertisement registers into the advertising system server 108, all of its parameters' relevance can be estimated based on the trained statistical model. In this process, the new advertisement may be viewed as being numerically classified with some similar historical advertisements, because similar advertisements tend to have a similar raw parameter ranking vector. As such, a parameter may tend to have similar real relevance values for similar advertisements. When more and more new advertisements register into the advertising system server 108, and are observed for their performances, the statistical model 304 can be dynamically updated by incremental logistic regression with the new training data.

Figure 4:
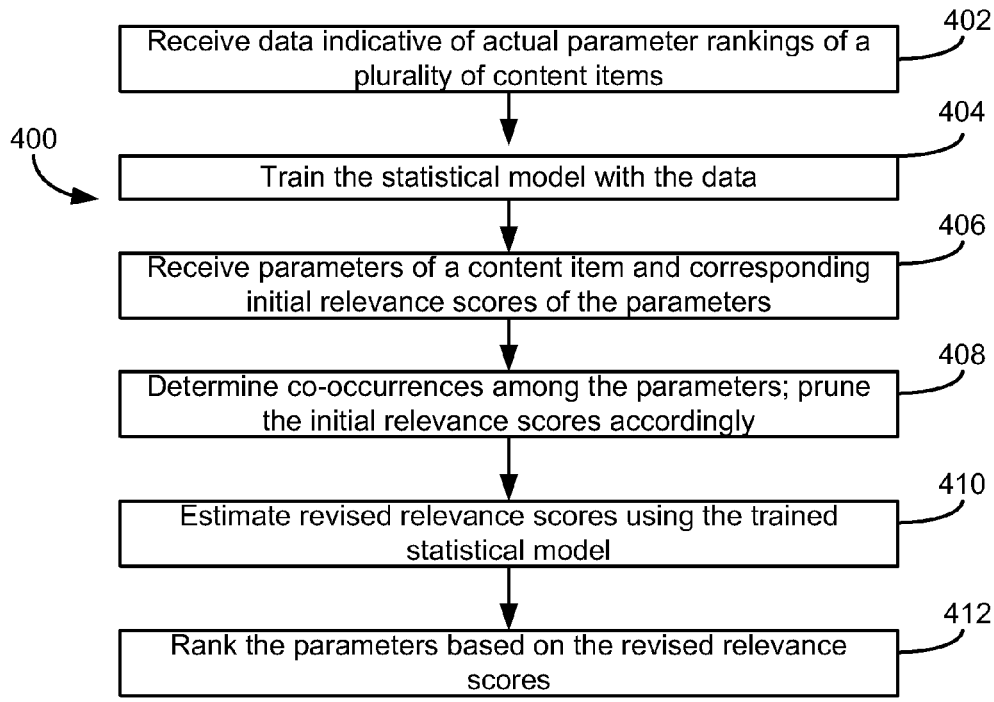
FIG. 4 is a flow diagram of a method in accordance with some described implementations.

FIG. 4 is a flow diagram of an example of a method 400 for ranking parameters of a content item using a statistical model according to some described implementations. A number of other approaches may also be employed to carry out the methods according to the present disclosure. The method 400 shown in FIG. 4 may be executed or otherwise performed by one of a combination of various systems. The method 400 may be implemented by a computer, a computer program product, a client, a server, a client-server relationship, etc. For example, the method 400 may be described herein as carried out by advertising system server 108, which may be implemented in accordance with the teachings of FIG. 5, by way of example.

At block 402, historical data indicative of actual parameter rankings may be received for a plurality of content items, such as advertisements previously shown and studied. At block 404, the statistical model may be trained with the historical data. At block 406, one or more processing circuits may receive a plurality of parameters of a new content item and a plurality of corresponding initial relevance scores of the parameters indicating relevance of the parameters to the new content item. The corresponding initial relevance scores may be predetermined raw rankings of the parameters, e.g., all with values of "1." At block 408, co-occurrences may be determined among the plurality of parameters, and the plurality of initial relevance scores may be pruned for those parameters lacking co-occurrences. At block 410, the trained statistical model may be employed to estimate a plurality of revised relevance scores form the initial relevance scores. Each of the revised relevance scores may be a function of at least some of the plurality of initial relevance scores (some of which may have been pruned at the block 408). At block 412, the plurality of parameters may be ranked based on the revised relevance scores. Such a ranking can subsequently be used for estimating a relevance of the content item (e.g., advertisement) to a main content item (e.g., webpage content), and used in an auction for an advertising slot for the advertisement.

Figure 5:
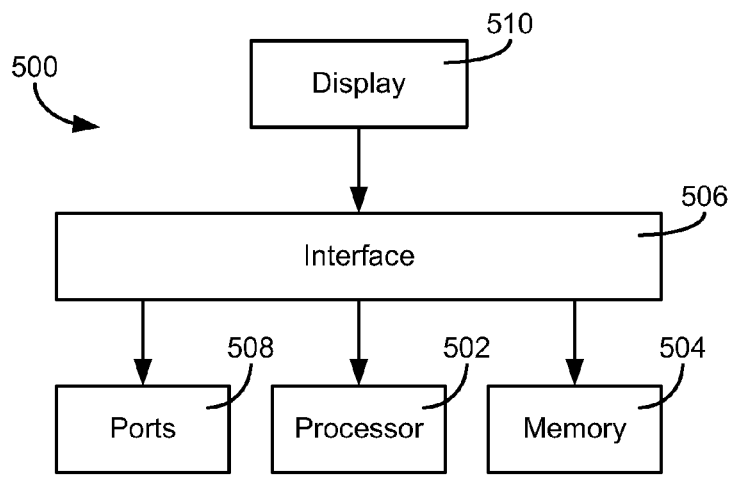
FIG. 5 is a block diagram of devices that may be used to implement the systems and methods in accordance with the described implementations.

FIG. 5 is a block diagram of a computing device 500 that may be used to implement the systems and methods in accordance with the described implementations, as either a client or as a server or plurality of servers. Computing device 500 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

Computing device 500 may includes a processor 502, memory 504, an interface 506 and ports 508. Each of the components 502, 504, 506, 508 may be interconnected using various busses, and may be mounted on a common motherboard or in other manners as appropriate. The processor 502 can process instructions for execution within the computing device 500, including instructions stored in the memory 504 to display graphical information for a GUI on an external input/output device, such as display 510 coupled to interface 508.

In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, a multi-processor system, etc.). The ports 508, which may include various communication ports (e.g., USB, Bluetooth, Ethernet, wireless Ethernet, etc.), may be coupled to one or more input/output devices, such as a keyboard, a mouse, a pointing device, a scanner, etc., or a networking device (a switch, adapter, bridge, router, hub, repeater, etc.).

The processor 502 may provide, for example, for coordination of the other components of the device 500, such as control of user interfaces, applications run by device 500, and wireless communication by device 500. Processor 502 may communicate with a user via interface 506 (e.g., control, display, external, etc.), coupled to a display 510. The display 510 may be, for example, a TFT (Thin-Film-Transistor Liquid Crystal Display) display, an OLED (Organic Light Emitting Diode) display, other flexible display, etc. The interface 506 may include circuitry for driving the display 510 to provide graphical, textual, and other information to a user. The interface 406 may receive commands (e.g., voice-activated, text, etc.), from a user and convert them to provide to the processor 502.

In addition, the interface 506 may be provided to communicate with processor 502 and enable near area communication of device 500 with other devices. The interface 506 may provide, for example, for wired communication. In some implementations, multiple interfaces may be used. Computing device 500 may communicate wirelessly through interface 506, which may include digital signal processing circuitry where necessary. Interface 506 may provide for communications under various modes or protocols, such as GSM voice calls, SMS, EMS, or MMS messaging, CDMA, TDMA, PDC, WCDMA, CDMA2000, or GPRS, etc. Such communication may occur, for example, through a radio-frequency transceiver. In addition, short-range communication may occur, such as using a Bluetooth, WiFi, or other such transceiver. In addition, GPS (Global Positioning System) receiver module may provide additional navigation- and location-related wireless data to device 500, which may be used as appropriate by applications running on device 500. The device 500 may also be provided with a storage device to provide additional storage, e.g., solid-state flash media. Each of the components may be interconnected using various buses. Several of the components may be mounted on a common motherboard or in other appropriate manners.

Device 500 may communicate audio feedback. In some implementations, an audio codec may receive spoken information from a user and convert it to usable digital information. The audio codec may generate audible sound for a user, such as through a speaker, e.g., in a handset of device. Sound(s) may include sound from voice telephone calls, recorded sound (e.g., voice messages, music files, etc.), sound(s) generated by applications operating on device, etc.

The memory 504 may store information within the computing device 500. In some implementations, the memory 504 may be a volatile memory unit or units. In some other implementations, the memory 504 may be a non-volatile memory unit or units. The memory 504 may also be another form of computer-readable medium, such as a magnetic or optical disk. The memory 504 may be capable of providing mass storage for the computing device 500. In some implementations, the memory 504 may be or contain a computer-readable medium, such as a floppy disk device, a hard disk device, an optical disk device, or a tape device, a flash memory or other similar solid state memory device, or an array of devices, including devices in a storage area network or other configurations.

A computer program product may be tangibly embodied in an information carrier, such as a non-transitory computer-readable medium. The computer program product may also contain instructions that, when executed, perform one or more methods, such as those described above. The information carrier may be a computer or machine-readable medium, such as the memory 504, memory on processor 502, a propagated signal, etc. Expansion memory may be provided and connected to device 500 through interface 506.

These computer programs (e.g., programs, software, software applications or code), include machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Controllers (PLCs) Programmable Logic Devices (PLDs)), used to provide machine instructions and/or data to a programmable processor.

To provide for interaction with a user, the systems and techniques described here can be implemented on a computer having a display device (e.g., a CRT (cathode ray tube) or LCD (liquid crystal display) monitor), for displaying information to the user and a keyboard and a pointing device (e.g., a mouse or a trackball), by which the user can provide input to the computer. Other kinds of devices can be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back-end component, a middleware component, or a front-end component, or any combination of back-end, middleware, or front-end components. The components of the system may be interconnected by any form or medium of digital data communication (e.g., a communication network). Examples of communication networks include a local area network ("LAN"), a wide area network ("WAN"), and the Internet.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A computer-implemented method for ranking relevance of parameters of a content item, the method comprising:
    receiving, using at least one processing circuit, a plurality of parameters of a content item and a plurality of corresponding initial relevance scores of the parameters indicating relevance of the parameters to the content item;
    estimating, using a statistical model, a plurality of revised relevance scores from the initial relevance scores, wherein each of the revised relevance scores is a function of at least two of the plurality of initial relevance scores; and
    ranking the plurality of parameters based on the revised relevance scores.

2. The method of claim 1, further comprising:
    receiving data indicative of actual ranking of parameters of a plurality of content items; and
    training the statistical model using the data.

3. The method of claim 2, wherein the training is based on at least one of a logistic regression method, a linear regression method, or a Naive Bayes method.

4. The method of claim 1, wherein the parameters comprise at least one of a keyword, a semantic cluster extracted from text of the content item, a category of the content item, or data indicative of user identifiers' visits to the content item.

5. The method of claim 1, further comprising:
    determining co-occurrences among the plurality of parameters; and
    pruning the plurality of initial relevance scores as variables of the function.

6. The method of claim 5, where the pruning comprises pruning parameters and their associated initial relevance scores having a co-occurrence frequency with respect to a relevant parameter lower than a threshold.

7. The method of claim 1, further comprising receiving a bid for an online slot for the content item based on the ranking.

8. The method of claim 1, wherein the receiving is from a plurality of sources, and wherein the plurality of initial relevance scores are obtained from combined voting from the plurality of sources.

9. A system for ranking relevance of parameters of a content item, the system comprising at least one processing circuit configured to:
    receive a plurality of parameters of a content item and a plurality of corresponding initial relevance scores of the parameters indicating relevance of the parameters to the content item;
    estimate, using a statistical model, a plurality of revised relevance scores from the initial relevance scores, wherein each of the revised relevance scores is a function of at least two of the plurality of initial relevance scores; and
    rank the plurality of parameters based on the revised relevance scores.

10. The system of claim 9, wherein the at least one processing circuit is further configured to:
    receive data indicative of actual ranking of parameters of a plurality of content items; and
    train the statistical model using the data.

11. The system of claim 10, wherein the statistical model is trained based on at least one of a logistic regression method, a linear regression method, or a Naive Bayes method.

12. The system of claim 9, wherein the parameters comprise at least one of a keyword, a semantic cluster extracted from text of the content item, a category of the content item, or data indicative of user identifiers' visits to the content item.

13. The system of claim 9, wherein the at least one processing circuit is further configured to:
    determine co-occurrences among the plurality of parameters; and
    prune the plurality of initial relevance scores as variables of the function.

14. The system of claim 9, wherein the at least one processing circuit is further configured to receive a bid for an online slot for the content item based on the ranking.

15. The system of claim 9, further comprising a plurality of parameter sources, and wherein the plurality of initial relevance scores are obtained from combined voting from the plurality of sources.

16. A non-transitory computer-readable medium having instructions stored thereon for execution by at least one processing circuit to rank relevance of parameters of a content item, the instructions comprising:
    receiving a plurality of parameters of a content item and a plurality of corresponding initial relevance scores of the parameters indicating relevance of the parameters to the content item;
    estimating, using a statistical model, a plurality of revised relevance scores from the initial relevance scores, wherein each of the revised relevance scores is a function of at least two of the plurality of initial relevance scores; and
    ranking the plurality of parameters based on the revised relevance scores.

17. The non-transitory computer-readable medium of claim 16, wherein the instructions further comprise:
    receiving data indicative of actual ranking of parameters of a plurality of content items; and
    training the statistical model using the data.

18. The non-transitory computer-readable medium of claim 17, wherein the training is based on at least one of a logistic regression method, a linear regression method, or a Naive Bayes method.

19. The non-transitory computer-readable medium of claim 16, wherein the instructions further comprise:
    determining co-occurrences among the plurality of parameters; and
    pruning the plurality of initial relevance scores as variables of the function.

20. The non-transitory computer-readable medium of claim 19, where the pruning comprises pruning parameters and their associated initial relevance scores having a co-occurrence frequency with respect to a specified parameter lower than a threshold.

* * * * *